United States Patent

[11] 3,585,528

[72] Inventor Robert L. Wallace, Jr.
Warren Township, Somerset County, N.J.
[21] Appl. No 771,158
[22] Filed Oct. 28, 1968
[45] Patented June 15, 1971
[73] Assignee Bell Telephone Laboratories, Incorporated
Murray Hill, Berkeley Heights, N.J.

[54] HALL-EFFECT MODULATOR INCLUDING DISTORTION SUPPRESSION MEANS
6 Claims, 4 Drawing Figs.

[52] U.S. Cl. .......... 332/29 M, 179/100.2 CH, 307/309, 324/45, 329/200, 330/6, 332/51 H
[51] Int. Cl. .......... H03c 3/12, H03c 1/48
[50] Field of Search .......... 332/29, 29 M, 51 H; 329/200; 307/309; 324/45; 317/235—23; 179/100.2 CH; 330/6

[56] References Cited
UNITED STATES PATENTS

| | | | |
|---|---|---|---|
| 3,003,105 | 10/1961 | Kostyshyn | 179/100.2 (CH) X |
| 3,097,296 | 7/1963 | Chasmar et al. | 307/309 X |
| 3,143,714 | 8/1964 | Evans et al. | 332/51 (H) |
| 3,214,609 | 10/1965 | Drew et al. | 332/51 (H) X |
| 3,339,129 | 8/1967 | Bulman et al. | 317/235(23) |
| 3,419,737 | 12/1968 | Toda | 307/309 |

*Primary Examiner*—Alfred L. Brody
*Attorneys*—R. J. Guenther and William L. Keefauver

ABSTRACT: In practical Hall-effect modulators, unwanted signal components, for example, carrier frequency harmonics and magnetic field components, appear in the output signal. These unwanted signal components are suppressed by selectively shaping a face of a magnetic core member of the modulator to introduce an inhomogeneity into the magnetic field applied to the Hall element. Further suppression of unwanted signal components is achieved by utilizing a potentiometer connected between output terminals of the Hall element and an additional terminal substantially in the center of the element.

INVENTOR
BY R. L. WALLACE, JR.
A. E. Hirsch Jr.
ATTORNEY

HALL-EFFECT MODULATOR INCLUDING DISTORTION SUPPRESSION MEANS

This invention relates to Hall-effect apparatus and, more particularly, to minimizing unwanted signal components in the output of Hall devices.

BACKGROUND OF THE INVENTION

Hall-effect devices have been proposed for use in many applications. They are particularly suited for use as modulators because of their signal multiplying ability. Generally, a carrier frequency signal is applied to a Hall-effect element in the form of a magnetic field to be modulated by a signal applied directly to the element. Theoretically, Hall-effect modulators yield ideal balanced modulated signals. In practice, however, unwanted signal components are developed in the output of Hall-effect modulators because of inherent device irregularities.

It is well known that effective utilization of Hall-effect elements in multipliers or modulators requires application of an intense uniform magnetic field. Indeed, unwanted signal components are generated in the Hall-effect element by the applied magnetic field, thereby corrupting the output signal.

Many techniques have been suggested for minimizing unwanted signal components in the output of Hall-effect devices. In systems utilizing the suggested techniques, difficulties are experienced in attaining adequate suppression of the unwanted signal components. Thus, although the suggested techniques may be useful in certain applications, they are unsatisfactory for use in others.

It is therefore an object of the invention to improve operation of Hall-effect apparatus.

It is another object of the invention to eliminate unwanted signal components in the output of Hall-effect apparatus.

It is yet another object of the invention to minimize unwanted carrier frequency and magnetic signal components induced in the output of Hall-effect modulators.

It is a further object of the invention to generate a suppressed carrier modulated signal in which unwanted signal components induced in the output signals of Hall-effect elements are substantially eliminated.

SUMMARY OF THE INVENTION

These and other objects are accomplished in accordance with the inventive principles described herein by selectively introducing an inhomogeneity into a magnetic field applied to a Hall-effect element and/or by selectively compensating for terminal misplacement on the Hall-effect element.

I have discovered that certain unwanted signal components are substantially suppressed in the output of a Hall-effect element if a region of reduced magnetic field intensity is selectively positioned in the magnetic field applied to the Hall-effect element. Additional unwanted signal components are minimized in the Hall output by positioning a terminal substantially in the center of the Hall element and by adjusting an impedance placed between the added terminal and each of the existing output terminals; unwanted signals developed at the output terminals are thus balanced.

More specifically, a Hall-effect modulator in accordance with the invention includes a semiconductor element disposed in an air gap defined by the pole faces of a plurality of magnetic core members. A first signal is supplied to the magnetic core members via coil windings and hence to the semiconductor element in the form of a controlled magnetic field. A second signal is applied directly to input terminals connected to the semiconductor element. As is well known in the art, a signal developed at the output terminals of the semiconductor Hall element is proportional to the product of the applied magnetic field and the current flowing through the semiconductor. Equally well known is that this output signal contains unwanted signal components because of intrinsic irregularities in the semiconductor Hall element.

The unwanted signal components must be minimized to utilize effectively Hall elements as modulators in practical systems. This is accomplished in accordance with the invention by uniquely shaping the pole face of at least one of the magnetic core members to deform selectively the air gap defined by the pole faces. The shaped core member is positioned in juxtaposition to the semiconductor element to locate selectively a region of reduced magnetic field intensity in the magnetic field applied to the semiconductor element, so that unwanted signal components are minimized in the output signals developed by the Hall element.

These and other objects and advantages of the invention will be more fully understood from the following detailed description of an illustrative embodiment thereof taken in connection with the appended drawings.

BRIEF DESCRIPTION

DETAILED DESCRIPTION OF THE INVENTION

Figure 1:
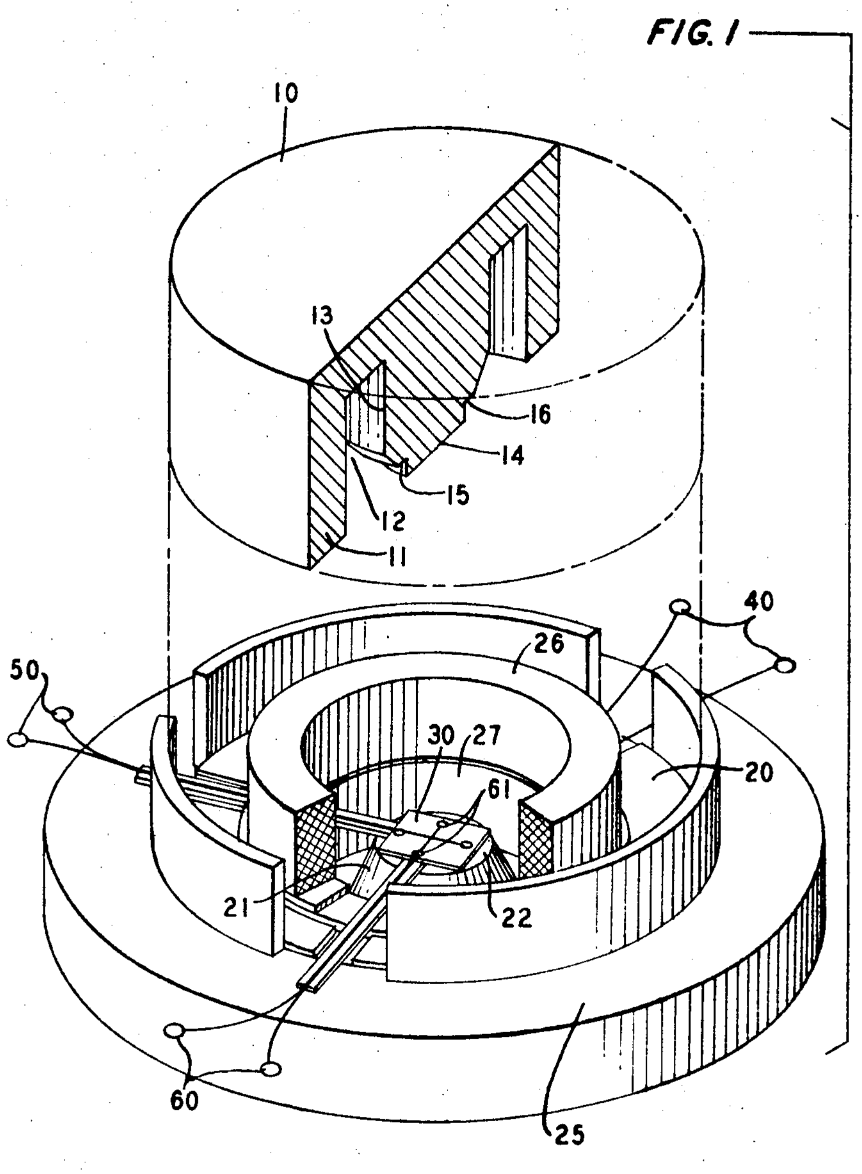
FIG. 1 is a partial-exploded perspective view of Hall-effect apparatus utilizing principles of the invention.

FIG. 1 illustrates Hall-effect apparatus suitable for generating modulated signals. Magnetic core member 10 is depicted in detached sectional form. Preferably, core member 10 is constructed of a nonconducting magnetic material, for example, ferrite and is a unitary structure comprising outer wall 11, and center pole 13 separated from the outer wall by intervening annular space 12. Face 14 of pole 13 is substantially flat, except for indentations 15 and 16 to be discussed below.

Second magnetic core member 20 is supported in holder 25. Core member 20 is essentially identical to core member 10, except for the exclusion of indentations in face 22 of pole 21. Magnetic field inducing coils 26 and 27 are placed in juxtaposition to poles 13 and 21 of core members 10 and 20, respectively. Coil 26 is placed in annular space 12, while coil 27 is placed in a similar space in core member 20.

Core members 10 and 20 are constructed so that a magnetic circuit having a substantially uniform air gap between pole faces 14 and 22 is effected when core members 10 and 20 are juxtaposed to one another and coils 26 and 27 are suitable energized. A magnetic circuit utilizing core construction essentially identical to the above is discussed in detail in U.S. Pat No. 3,097,296 issued to R. P. Chasmar and E. Cohen on July 9, 1963.

Hall element 30 is symmetrically disposed in the air gap formed between faces 14 and 22 of core members 10 and 20, respectively, so that the lines of magnetic flux of a magnetic field developed in the air gap are applied at right angles to the surfaces of element 30 adjacent pole faces 14 and 22. Typically, element 30 is secured to the face of one pole, for example, face 22 of pole 21. Preferably, Hall element 30 is substantially square in profile and made of a semiconductor material, for example, indium arsenide, epitaxially grown on a high resistance gallium arsenide substrate. However, Hall elements having other geometric shapes and made of other materials may be employed in the practice of the invention.

In practice, faces 14 and 22 of nonconducting core members 10 and 20, respectively, are placed substantially in contact with element 30. This minimizes the air gap width, yielding a more intense magnetic field for a given current flowing in coils 26 and 27 than would otherwise be realizable.

In operation as a modulator, a first signal, for example, a carrier frequency signal, is supplied to coils 26 and 27 via terminals 40, and in turn, to Hall element 30 in the form of a magnetic field induced in the air gap formed by faces 14 and 22 of cores 10 and 20, respectively. A second signal, for example, one which is used to modulate the carrier frequency signal, is supplied directly to Hall element 30 via terminals 50. As is well known in the art, signals developed at terminals 60 are the product of the carrier frequency signal and the modulating frequency signal. Theoretically, for sinusoidal carrier and modulating signals and provided the magnetic carrier input is not too large in magnitude, the output signal developed at terminals 60 includes only the upper and lower sidebands, namely, the sum and difference frequencies. Thus, the Hall-effect modulator is inherently a balanced modulator.

In practice, however, Hall-effect modulator output signals are usually contaminated with unwanted signal components, thereby minimizing their usefulness. Some of the unwanted signal components are known to be caused by inherent device irregularities, for example, variations in resistivity of the semiconductor material and variations in thickness of the semiconductor element, among others. Typical sources of Hall-device output signal errors are discussed in greater detail by K. K. W. Heide and D. Silverman in an article entitled "Stabilization of the Hall-effect Multiplier," *Solid-State Design*, Oct. 1963.

The unwanted signal components appear in the Hall output as, for example, carrier frequency harmonics, modulation frequency harmonics and other magnetic components. These signals are detrimental to operation in many systems, especially in those utilizing a plurality of closely spaced transmission channels to transmit individual message units, for example, and N-carrier telephone transmission system. In such a system, the unwanted signal components appear as "crosstalk" in adjacent or other transmission channels. Heretofore, crosstalk was eliminated by using band-pass filters in each channel, both at the transmitter and at the receiver.

These and other unwanted signal components are suppressed in the output of a Hall-effect modulator in accordance with the invention by selectively establishing an inhomogeneity in the magnetic field applied to Hall element 30. This is accomplished by selectively shaping the air gap formed between faces 14 and 22 of core members 10 and 20, respectively. Preferably, small, shallow indentations, for example, notches 15 and 16 are cut into face 14 of pole 13 to deform the air gap and introduce the inhomogeneity into the magnetic field induced in the air gap.

Figure 2:
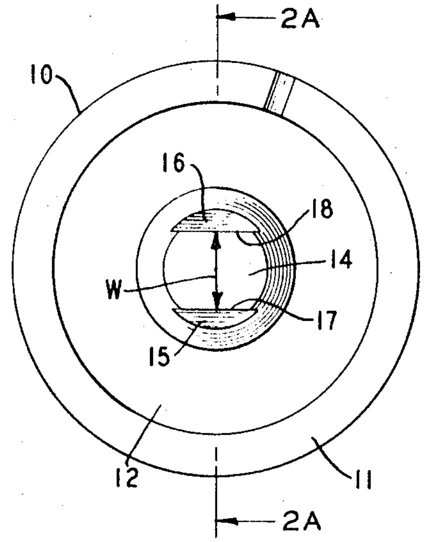
FIG. 2 is a plan view illustrating details of magnetic core member of FIG. 1.
Figure 2A:
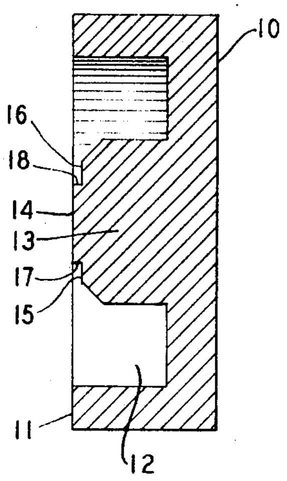
FIG. 2A is a sectional view further depicting the details of the magnetic core element of FIG. 2.

Turning briefly to FIGS. 2 and 2A, core member 10, including notches 15 and 16, is depicted in detail. Notches 15 and 16 are arranged so that width W of face 14 is slightly smaller than the width of Hall element 30. Empirical measurements have indicated that the dimensions of notches 15 and 16 are not overly critical. Preferably, the notch area is small as compared to the overall area of the pole face. Typically, for a pole face having a diameter of 0.200 inches, width W is approximately 0.150 inches. Although notches are preferred, other pole face shapes may be employed to establish a deformity in the air gap for introducing a controlled inhomogeneity into the magnetic field to be applied to a Hall element.

Pole face 14 of core member 10 is positioned initially with respect to Hall element 30 (FIG. 1), so that edges 17 and 18 (FIG. 2) of notches 15 and 16, respectively, are located symmetrically above output contacts 61 (FIG. 1), and edges 17 and 18 are essentially perpendicular to a line drawn between contacts 61. With this configuration, unwanted signal components developed in the Hall output are predominantly fundamental carrier frequency components. It has been discovered that slight translation of core member 10 and hence notches 15 and 16 in a direction parallel to a line drawn between contacts 61 of Hall element 30, substantially eliminates the unwanted fundamental carrier frequency components in the Hall output. Translation of the core member to position selectively the inhomogeneity in the magnetic field, however, may cause other unwanted signal components to be developed in the output of the Hall element. For example, components may be developed at twice the carrier frequency plus or minus the modulating frequency ($2W_c \pm W_m$). Such additional unwanted signal components are suppressed, in accordance with the invention, by rotating core member 10 and hence notches 15 and 16 with respect to Hall element 30. Empirically, it has been found that a rotation of approximately one or two degrees from the initial position maximizes suppression of the $2_c \pm W_m$ components. The rotational movement further positions the inhomogeneity in the magnetic field with respect to Hall element 30 for maximizing suppression of the unwanted harmonic signals.

It is noted that other precautions, well known in the art, are turned to account in suppressing unwanted signal components in the Hall output. Typical among these are critical placement of the input and output terminals upon the Hall element and the input and output lead placement and the like. Selective introduction of the inhomogeneity in the magnetic field, however, yields results which were heretofore unattainable. For example, the unwanted signals are more then 90 db. down from the desired sidebands in the 3 Kilohertz frequency range. As the carrier frequency increases into the high kilohertz range, the unwanted carrier frequency output component increases in magnitude at a 20 db. per decade rate.

Generally, other unwanted signal components are developed in the output of Hall elements because of terminal misplacement. These signal components are developed by eddy currents induced in the Hall element in response to the magnetic field applied to the element. Ideally, the eddy current signal components, which are, for example, $2W_c \pm_m$, should balance out. However, because of difficulties in placing the output terminal on the Hall element and inherent irregularities of the element, the signals do not cancel.

Figure 3:
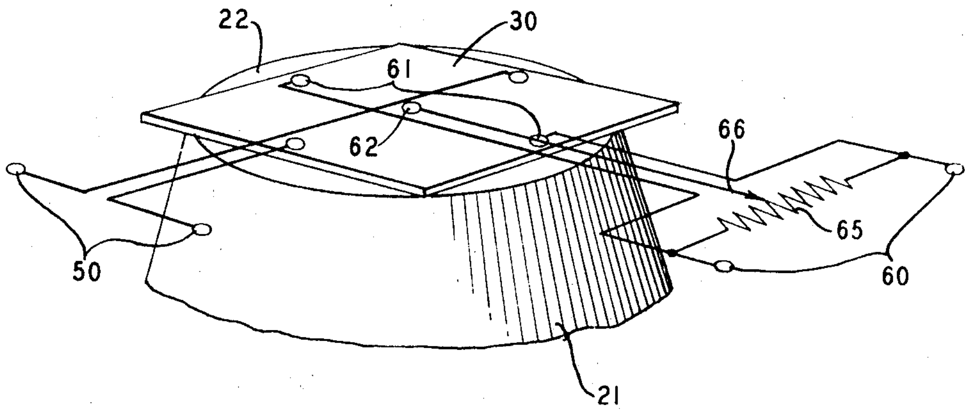
FIG. 3 depicts a Hall-effect element in which principles of the invention are utilized.

The imbalance of the signals developed by the eddy current may be compensated for externally, in accordance with the invention as shown in FIG. 3, by the placement of an additional terminal 62 substantially in the geometric center of Hall element 30. The separation of the input and output leads of Hall element 30, as shown in FIG. 3, is greatly exaggerated for clarity. In practice, the individual sets of leads, namely, input and output, protrude out of the air gap in a vertical coplanar arrangement. Potentiometer 65 is connected across output terminals 61. Wiper arm 66 is connected to terminal 62. In operation, wiper arm 66 of potentiometer 65 is moved to adjust the impedance between terminal 62 and terminals 61 for balancing the signal components caused by the circulating eddy currents. The balancing techniques as depicted in FIG. 3 may be utilized in conjunction with the other principles of the invention described above, namely, selective placement of an inhomogeneity in the magnetic field, or separately as desired.

The above-described arrangements are, of course, merely illustrative of the application of the principles of the invention. Numerous other arrangements may be devised by those skilled in the art without departing from the spirit or scope of the invention.

What I claim is:

1. Hall-effect modulator apparatus which comprises, a first magnetic core member having a pole face, a second magnetic core member having a pole face, said magnetic core members being in a predetermined spatial relationship so that said pole faces are in substantially parallel planes defining an air gap, at least one of said pole faces having a centrally located unnotched area and first and second notched areas symmetrically disposed on either side of said unnotched area to establish within said air gap in response to a magnetic flux induced in said magnetic core members a first magnetic field region having a first field intensity and a second magnetic field region having a second field intensity less than said first field intensity, said notched areas being substantially smaller than said unnotched area, coil means in juxtaposition to said magnetic core members for inducing said magnetic flux in said magnetic core members in response to a current supplied to said coil means, and a rectangular semiconductor plate having opposite faces and first and second input terminals and first and second output terminals symmetrically located on one of said opposite faces, said semiconductor plate being responsive to said magnetic fields and signals supplied to said input terminals for controllably developing signals which appear at said output terminals, wherein the width of said unnotched area of said pole face is smaller than the width of said semiconductor plate and wherein said semiconductor plate is symmetrically disposed within said air gap in substantially parallel alignment with said pole faces so that said first and second magnetic fields induced in said air gap are applied to said opposite faces of said semiconductor plate substantially to suppress unwanted signal components developed in said semiconductor plate because of inherent limitations including variations in resistivity and thickness of said semiconductor plate.

2. A Hall-effect modulator as defined in claim 1 wherein said semiconductor plate has an additional terminal located at a position between and in alignment with said first and second output terminals, said location of said additional terminal being substantially at the geometric center of said face of said semiconductor plate, and further includes potentiometer means having a first terminal, a second terminal and a wiper arm, said first and second terminals of said potentiometer means being connected to said first and second output terminals, respectively, and said wiper arm being connected to said additional terminal for balancing the magnitude of selected unwanted potentials developed in said semiconductor plate in response to eddy currents induced by said magnetic fields.

3. A Hall-effect modulator as defined in claim 1 wherein at least one of said magnetic core members is moveably related to the other of said magnetic core members for selectively positioning said first and second magnetic field regions in spatial relationship with the faces of said semiconductor plate so that suppression of said unwanted signal components is maximized.

4. Hall-effect signal multiplication apparatus of the type including a semiconductor plate having opposite faces and a thickness substantially smaller than the length or width of the faces, said semiconductor plate having input terminals and first and second output terminals symmetrically positioned on one of said opposite faces of said semiconductor plate and said semiconductor plate being responsive to a substantially uniform magnetic field applied to said faces and signals supplied to said input terminals for controllably developing signals at said output terminals, wherein the improvement comprises, an additional terminal located at a position between and in alignment with said first and second output terminals, said location of said additional terminal being substantially at the geometric center of said opposite face of said semiconductor plate, and adjustable resistor means having a first terminal, a second terminal and a wiper arm, said first and second terminals of said resistor means being connected to said first and second output terminals, respectively, and said wiper arm being connected to said additional terminal for balancing the magnitude of selected unwanted potentials developed in said semiconductor plate in response to eddy currents induced by said magnetic field.

5. Apparatus as defined in claim 1, wherein said notched pole face is substantially circular having a raised portion thereon bounded by substantially parallel chords of said circular face.

6. Apparatus as defined in claim 1, wherein said rectangular semiconductor plate is an epitaxial indium arsenide semiconductor.